(12) United States Patent
Campbell

(10) Patent No.: US 9,933,520 B1
(45) Date of Patent: Apr. 3, 2018

(54) ORTHOGONAL LINEAR FREQUENCY MODULATION FOR MIMO RADAR

(71) Applicant: Waymo LLC, Mountain View, CA (US)

(72) Inventor: Timothy Campbell, Los Angeles, CA (US)

(73) Assignee: Waymo LLC, Mountain View, CA (US)

( * ) Notice: Subject to any disclaimer, the term of this patent is extended or adjusted under 35 U.S.C. 154(b) by 358 days.

(21) Appl. No.: 14/753,887

(22) Filed: Jun. 29, 2015

(51) Int. Cl.
*G01S 13/93* (2006.01)

(52) U.S. Cl.
CPC ....... *G01S 13/931* (2013.01); *G01S 2013/935* (2013.01); *G01S 2013/9346* (2013.01)

(58) Field of Classification Search
CPC ........... G01S 13/931; G01S 2013/9346; G01S 2013/935
USPC .......................................................... 342/70
See application file for complete search history.

(56) References Cited

U.S. PATENT DOCUMENTS

2011/0057831 A1* 3/2011 Shinomiya ................ G01S 3/74
342/74

* cited by examiner

*Primary Examiner* — Timothy A Brainard
(74) *Attorney, Agent, or Firm* — McDonnell Boehnen Hulbert & Berghoff LLP

(57) ABSTRACT

Disclosed herein are embodiments that relate to phase coded linear frequency modulation for a radar system. Embodiments include transmitting at least one signal pulse with a binary phase shift keying (BPSK) encoding. The method also includes receiving a signal associated with reflection of the at least one transmitted signal pulse. The received signal may include at least two channels. Further, the method may also include processing the received signal to determine target information. The processing may include performing a despread operation that provides a phase offset based on a filtering range. Additionally, the processing may include performing a reconstruction operation that comprises creating a virtual spatial channel based on combining the two received channels. Yet further, the processing may include determining the target information based on the virtual spatial channel. An autonomous vehicle may be controlled based on the determined target information.

21 Claims, 6 Drawing Sheets

ORTHOGONAL LINEAR FREQUENCY MODULATION FOR MIMO RADAR

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to orthogonal linear frequency modulation for a multiple-input multiple-output (MIMO) radar for a radar system. In one aspect, the present application describes a method of signaling for use with a radar system. The method includes transmitting, by a radar unit, at least one signal pulse, wherein the transmitting includes transmitting the at least one signal pulse with a binary phase shift keying (BPSK) encoding. The method also includes receiving, by the radar unit, a signal associated with reflection of the at least one transmitted signal pulse. The received signal may include at least two channels. Further, the method may also include processing the received signal to determine target information. The processing may include performing a despread operation, where the despread operation provides a phase offset based on a filtering range. Additionally, the processing may include performing a reconstruction operation, where the reconstruction operation comprises creating a virtual spatial channel based on combining the two received channels. Yet further, the processing may include determining the target information based on the virtual spatial channel. An autonomous vehicle may be controlled based on the determined target information.

In another aspect, the present application describes an apparatus. The apparatus includes a radar unit. The radar unit has a transmitter configured to transmit at least one signal pulse with a binary phase shift keying (BPSK) encoding. The radar unit also has a receiver configured to receive a signal associated with reflection of the at least one transmitted signal pulse. The received signal may include at least two channels. The apparatus also includes a processing unit. The processing unit may be configured to perform a despread operation on the received signal, where the despread operation provides a phase offset based on a filtering range. The processing unit may also be configured to perform a reconstruction operation, where the reconstruction operation comprises creating a virtual spatial channel based on combining the two received channels. The processing unit may be further configured to determine target information based on the virtual spatial channel. And finally, the processing unit may be configured to control an autonomous vehicle based on the determined target information.

In yet another example, a computing device is provided. The computing device may include a processor and a computer readable medium having stored thereon program instructions that when executed by the processor cause the computing device to perform functions. The functions include transmitting, by a radar unit, at least one signal pulse. The at least one signal pulse may be transmitted with a binary phase shift keying (BPSK) encoding. The functions also include receiving, by the radar unit, a signal associated with reflection of the at least one transmitted signal pulse. The received signal may include at least two channels. Additionally, the functions include processing the received signal to determine target information. The processing may include performing a despread operation, where the despread operation provides a phase offset based on a filtering range. Additionally, the processing may include performing a reconstruction operation, where the reconstruction operation comprises creating a virtual spatial channel based on combining the two received channels. Yet further, the processing may include determining the target information based on the virtual spatial channel. The functions may further include controlling an autonomous vehicle based on the determined target information.

In another aspect, the present application describes an apparatus. The apparatus may be configured for signaling for use with a radar system. The apparatus includes means for transmitting at least one signal pulse, wherein the means for transmitting includes means for transmitting the at least one signal pulse with a binary phase shift keying (BPSK) encoding. The apparatus also includes means for receiving a signal associated with reflection of the at least one transmitted signal pulse. The received signal may include at least two channels. Further, the apparatus may also include means for processing the received signal to determine target information. The means for processing may include means for performing a despread operation, where the means for despread operation provides a phase offset based on a filtering range. Additionally, the means for processing may include means for performing a reconstruction operation, where the means for reconstruction operation comprises creating a virtual spatial channel based on combining the two received channels. Yet further, the means for processing may include means for determining the target information based on the virtual spatial channel. The apparatus further includes means for controlling an autonomous vehicle based on the determined target information.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
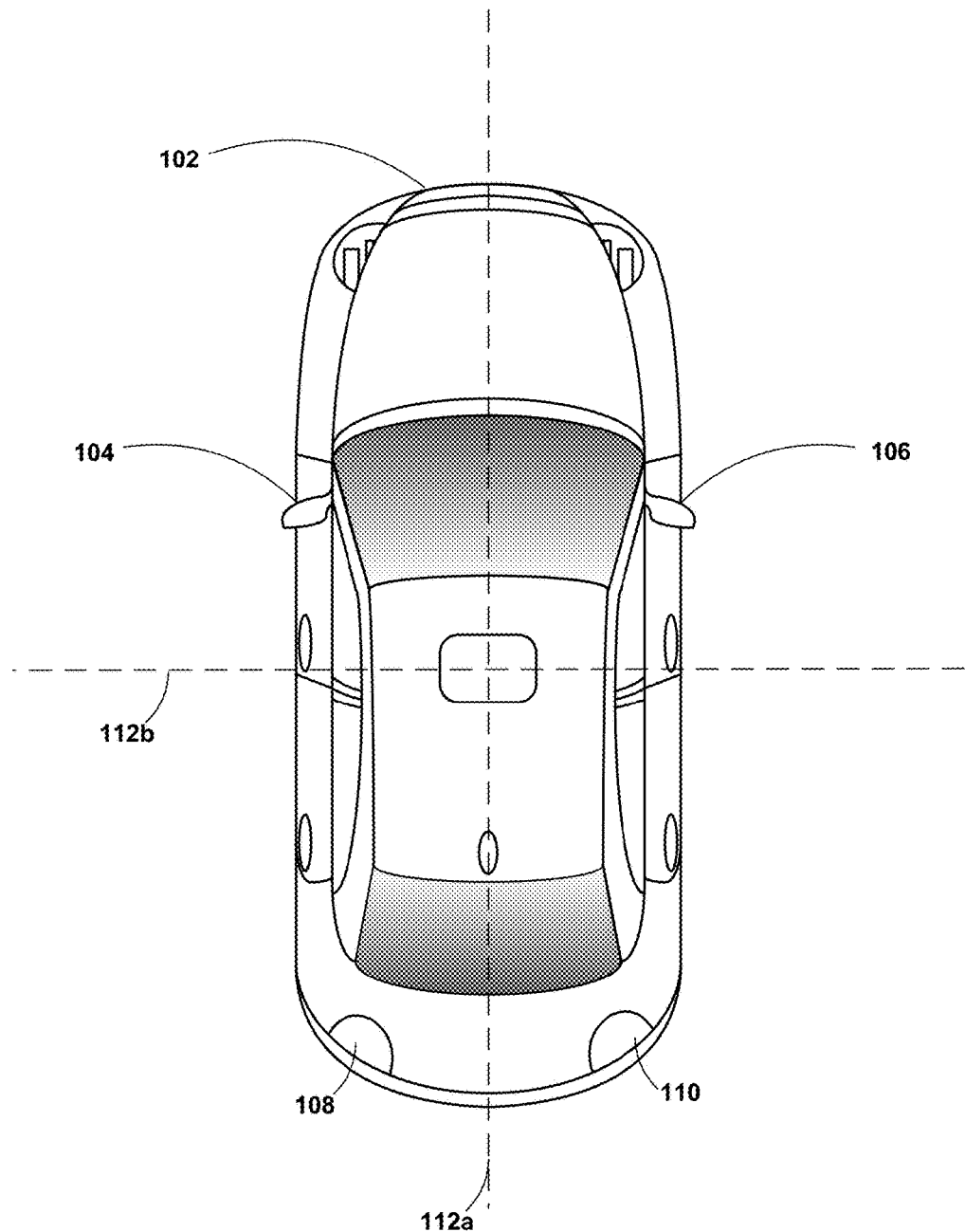
FIG. 1 illustrates an example layout of radar sectors

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for orthogonal linear frequency modulation for MIMO radar. In practice, vehicular radar systems may feature multiple radar units with each radar unit having an associated field of view. Additionally, the radar units may operate in an environment that may have radio noise. Typically, the signals from the multiple radar units and the radio noise may cause undesirable interference for the radar system. The apparatus and methods presented herein allow improved radar system functionality by using orthogonal linear frequency modulation for MIMO radar to aid in radar system operation.

Traditionally, vehicular radar systems have featured a single radar unit looking in a forward direction. These traditional radar systems would also typically only direct the radar beam in a single direction. When a vehicle has only a single radar unit with a beam that only was directed in a single direction, the precision required in the placement of the radar unit may be not as great as systems with multiple radar units with steerable beams. The non-steerable beam only interrogating one direction may cause the lower precision requirement. For example, a traditional vehicular radar system may only be configured to detect the presence of another vehicle directly in front of the vehicle having the radar system. Thus, as long as a radar beam generally points in the forward direction the traditional radar system would be able to detect the vehicle.

More advanced radar systems may be used with a vehicle in order to obtain a wider field of view than just that directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the car. In some examples, multiple radar units may be combined with steerable radar beams to further increase the interrogation region and the imagining resolution of the vehicular radar system.

One aspect of the present disclosure provides a method for the operation of signal processing system for a vehicular radar system. The presently disclosed system uses LFM waveforms having an additional binary phase shift keying (BPSK) encoding. By including the BPSK encoding a radar may be operated in a mode that enables a MIMO operation mode through the use of relatively inexpensive single-input multiple-output (SIMO) radar hardware.

The presently-disclosed method is based on a modification of a pulse-Doppler radar that uses a stretch LFM processor. A modulation stage is added after the transmit signal is synthesized but before it is amplified. The modulator is a BPSK block that can be controlled separately from the LFM exciter.

In order to achieve frequency diversity, two different frequency division methods are used in parallel with each other. The first operated in the intermediate frequency (IF) band and the other operates in the Doppler band. In one example, this signal processing method provides 4 channels (2 in each band). The disclosed method can be further extended to provide additional channels.

To create the first two of the four channels for transmission, the two intermediate frequency (IF) channels are created by mixing the LFM transmit signal with a square wave at half the analog-to-digital conversion (ADC) frequency created using the BPSK shifters. Although the BPSK harmonics will be out of band, the stretch processor may couple the BPSK modulation into the fast time domain. This coupling may be compensated for through both the waveform creation and receiver signal processing.

To create the second two of the four channels for transmission, the Doppler channels get created by flipping the fast time BPSK code every pulse for one of the channels. By flipping the fast time BPSK code, targets now become ambiguous at half the pulse repetition frequency (PRF), but this ambiguity can be removed. This means that the effective PRF remains the same. Additionally, the waveform may be designed so that clutter is contained within each channel. Moving targets may migrate across channel boundaries in Doppler, but this phenomenon can be mitigated through the design of the waveform as well.

The method disclosed here includes two signal-processing features to achieve the desired performance. First, a despread operation is performed on the received signal. Second, a reconstruction operation is performed on the received signal after the despread operation. The despread operation introduces a phase correction to the received signal based on a filtering range. The despread operation removes a distance-based phase offset from the various scatterer signals received by the radar unit. If not removed by the despread operation, the phase offset may create harmonics in a received signal. A spatial reconstruction operation may be used to assemble the MIMO virtual array. This virtual array may be processed as if it was a traditional spatial array. Two of the channels may be combined in the IF band to create a virtual channel that simulates a full MIMO array. This virtual channel may be processed as it if was a traditional received radar channel.

An example radar system for use with the present disclosure may include a multi-sector 90 degree field of view radar antenna architecture. This architecture enables an antenna to both scan across approximately 90-degrees of the azimuth plane (e.g. the horizontal plane) while also being mountable on various surfaces of a vehicle. Having a radar antenna with a 90 degree field of view may enable a radar system to scan a full 360-degree azimuth plane by having four radar units each configured to scan one 90-degree non-overlapping sector. Therefore, the example disclosed radar system may be able to steer a radar beam to interrogate the entire region in the azimuth plane of the vehicle. Thus, four such radars located on four corners of a car would provide a full 360-degree coverage around the car. For example, a system such as this may aid in autonomous driving of a vehicle.

When each radar unit can scan or span a 90-degree region, placing 4 radar units on a vehicle may enable the vehicle to scan a beam over the full 360-degree azimuth plane. Each of the four radar units may be configured to scan a beam over one sector (i.e. one quarter of the azimuth plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360 azimuth plane.

In some examples, the radar sectors may be defined based on where the radar units are mounted on the vehicle. In one example, one radar unit may be mounted in each of the side mirrors of the vehicle. The other two radar units may be mounted behind the taillights of the vehicle. In this example, the quadrants may be defined based on axes where one axis aligns with the direction of vehicular motion and the other axis aligns with the middle of the vehicle from front to back. In another example, the radar units may be mounted in order to have one pointing forward, one pointing backward, and one pointing to each side. In this second example, the axes of the quadrants may be at a 45 degree angle to the direction of motion of the vehicle. Additionally, the radar unit may be mounted on top of the vehicle.

The modular multi-sector 90 degree field of view radar antenna architecture may be able to steer the radar beams emitted from each radar unit. The radar beams may be steered by the radar units in various ways. For example, in some embodiments, the radar units may be able to steer the beam in an approximately continuous manner across the 90 degree field of view for the respective antenna or the radar units may be configured with sectoral sub beams spanning the 90 degrees. In other embodiments, the radar units may be able to steer the radar beam to predetermined directions within the 90 degree field of view for the respective antenna.

FIG. 1 illustrates an example layout of radar sectors for an autonomous vehicle 102. As shown in FIG. 1, each of the radar sectors may have an angular width approximately equal to the scanning range of the radar units (as will be described with respect to FIG. 2). For example, the sectors of FIG. 1 divide the azimuth plane around the autonomous vehicle 102 into 90 degree sectors. However, in examples where the radar units are configured to scan a radar beam over a different angle than 90 degrees, the width and number of sectors may change.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45 degree angle with respect to the two axes of the vehicle 102. By mounting the radar units a 45 degree angle with respect to the two axes of the vehicle 102, a 90 degree scan of the radar unit would scan from one vehicle axis to the other vehicle axis. For example, a radar unit mounted at a 45 degree angle to the axes in side mirror unit 104 may be able to scan the front left sector (i.e. from the vertical axis 112a through the front of the vehicle 102 to the axis 112b that runs through the side of the vehicle). An additional radar unit mounted at a 45 degree angle to the axes in side mirror unit 106 may be able to scan the front right sector. In order to scan the back right sector, a radar unit may be mounted in taillight unit 110. Additionally, in order to scan the back left sector, a radar unit may be mounted in taillight unit 108. The radar unit placements shown in FIG. 1 are merely one example. In various other examples, the radar units may be placed in other locations, such as on top of the vehicle, or within or behind other vehicle components. Further, the sectors may also be defined differently in various embodiments. For example, the sectors may be at a 45 degree angle with respect to the vehicle. In this example, one radar unit may face forward, another backward, and the other two to the sides of the vehicle.

In some examples, all the radar units of vehicle 102 may be configured with the same scanning angle. The azimuth plane around the vehicle is equal to a full 360 degrees. Thus, if each radar unit is configured with the same scanning angle, then the scanning angle for the radar units would be equal to approximately 360 degrees divided by the number of radar units on the vehicle, for full azimuth plane scanning.

If the vehicle 102 had two radar units, each would scan approximately 180 degrees. For three radar units, each would be configured to scan 120 degrees. For four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 2:
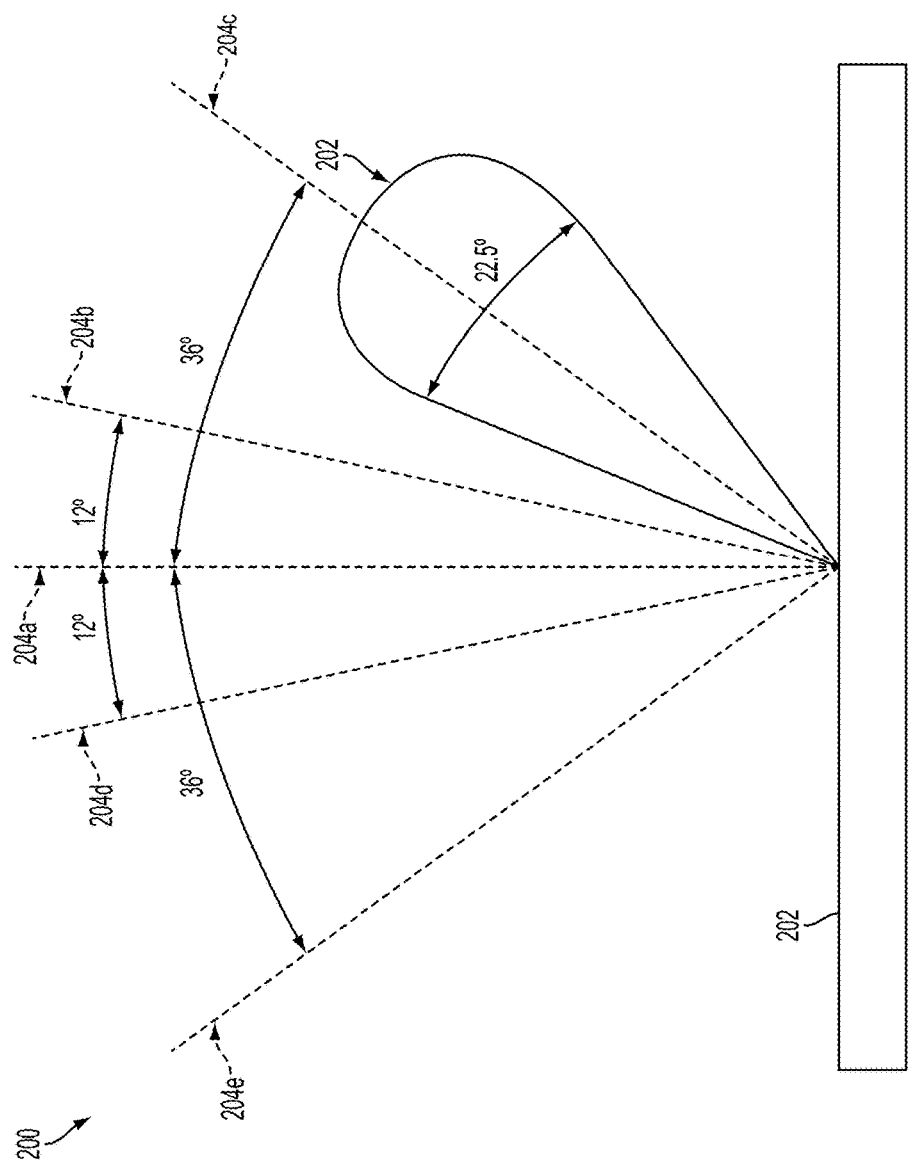
FIG. 2 illustrates example beam steering for a sector for a radar unit.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth plane. In other embodiments, the radar unit 200 may be able to scan the radar beam in discrete steps across the various angles of the azimuth plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90 degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees 604e, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of the radar beam 206 may be varied depending on the specific example.

For example, and further discussed below, a radar beam of a radar unit may be configured to only scan a 60 degree region. If a radar unit can scan a 60 degree region, six radar units may be used to scan a full 360 azimuth plane. However, if the radar unit can scan 90 degrees, four radar units may scan the full 360 azimuth plane.

Figure 3A:
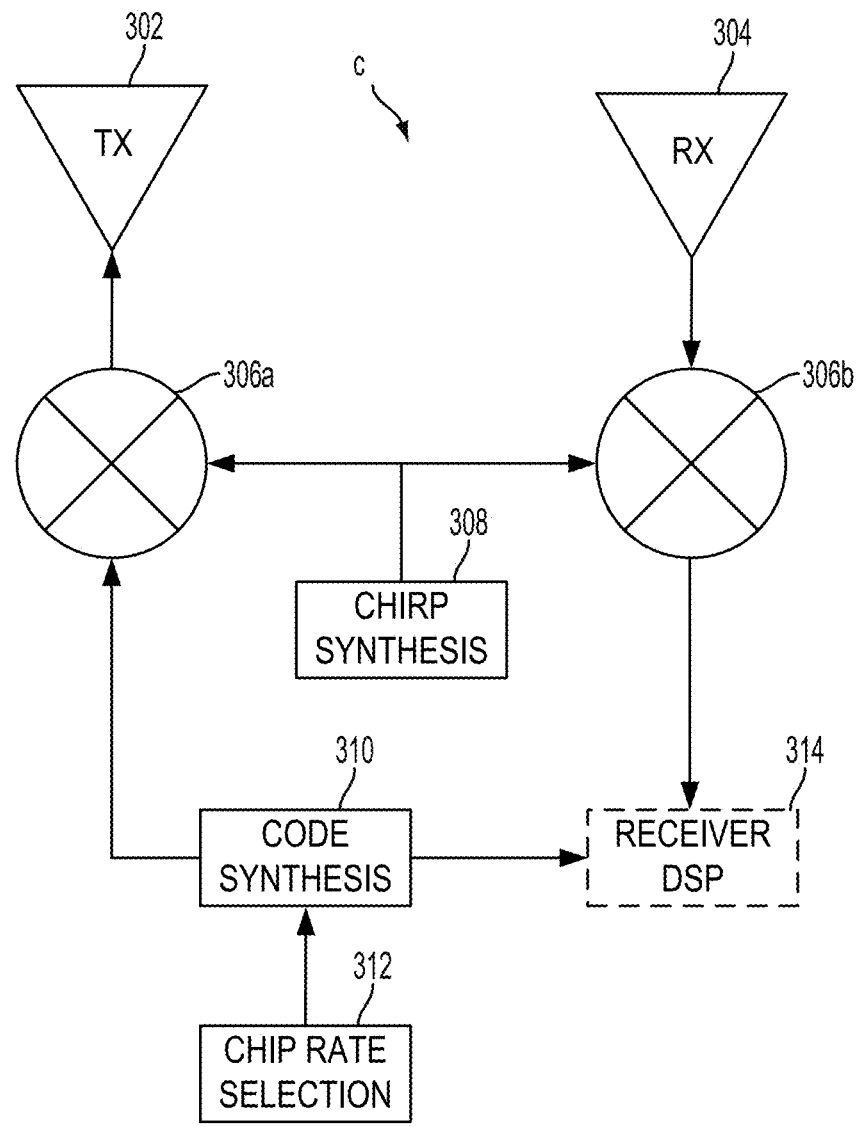
FIG. 3A illustrates an example radar system with orthogonal linear frequency modulation for MIMO.

FIG. 3 illustrates an example radar system 300 with orthogonal linear frequency modulation for MIMO Radar. The radar system 300 includes both a transmitter 302 and a receiver 304. The transmitter 302 may include components and electronics configured to transmit a radar signal. For example, the transmitter 302 may include circuitry configured to amplify a signal to a power level for transmission. The transmitter 302 may also include at least on antenna configured to transmit the radar signal. The receiver 304 may include components and electronics configured to receive a reflected radar signal. For example, the receiver 304 may include circuitry configured to amplify a received signal for further processing. The receiver 304 may also include at least on antenna configured to receive the reflected radar signal. In some examples, radar system 300 may include different antennas for transmission and antennas for reception of signals. In other examples, the radar system 300 may use the same antennas for both transmission and reception of signals.

The radar system 300 may also include a chirp synthesis module 308. The chirp synthesis module 308 is configured to create a chirp signal. The chirp signal may be used with both the transmission and reception of signals with the radar unit 300. The chirp signal created by the chirp synthesis module 308 may be a linear frequency modulated (LFM) signal. An LFM signal may be an up-chirp, that is, it has a frequency that increase linearly with time, or it may be a down-chirp, that is, it has a frequency that decreases linearly with time. An LFM signal may be used because the use of LFM signaling in radar may combine the benefits of the high energy of a long pulse width signal with the high resolution of a short pulse width signal. Higher energies allow a radar system to work at longer distances and also to detect smaller objects. Shorter pulses may allow a radar system to more finely detect ranges of detected objects.

The radar system 300 also includes a code synthesis module 310 and a chip rate selection module 312. The code synthesis module is configured to create an encoding for the transmitted signal. The encoding is configured to allow multiple radar units to function within proximity of each other. If there are several radar modules operating in the vicinity of each other and each does not have a unique encoding, the radar units may interfere with each other. However, by providing an encoding for each radar unit, the radar unit may be able to resolve received reflections to determine the portion of the received signal corresponding to a signal transmitted by the respective radar unit.

Additionally, the presently disclosed encodings may allow a single radar unit to transmit multiple orthogonally-encoded signals at one time (i.e. based on one LFM ramp signal). This may allow a radar unit to function as a multiple input, multiple output (MIMO) radar. Further, if a single radar unit transmits multiple orthogonally-encoded signals at one time, the signals may be received and decoded by multiple radar units, as long as the receiving radar unit applies the correct code to decode the radar signal.

In one example, multiple vehicles driving within proximity of each other may each have radar units. When the radar unit from one vehicle transmits a signal, the radar unit of a different vehicle may receive that signal. Without the use of an encoding on the signal, the radar unit receiving the signal may not operate correctly. The radar unit may incorrectly operate as if that respective radar unit transmitted the received signal. However, by transmitting signals with unique encodings a radar unit may filter or remove undesired signals from processing. In some further examples, a single vehicle may feature multiple radar units. Similarly, each radar unit may ideally operate by only receiving signals based on reflections from signals transmitting by the respective radar unit. Thus, each radar unit of a single vehicle may also be configured to transmit signals with an encoding unique to the respective radar unit.

In some examples, the code synthesis module 310 may create a binary phase-shift key (BPSK) signal for the encoding. The BPSK signal may have a code rate based on the output of the chip rate selection module 312. In some examples, the chip rate selection module 312 may selectively output a desired signaling chip rate based on a set chip rate. In other examples, the chip rate selection module 312 may selectively output a desired signaling chip rate based on a range of possible chip rates.

A BPSK modulation scheme encodes signals by modulating the phase of the carrier signal from in-phase to 180 degrees out-of-phase based on a respective code. In some embodiments, the codes may be orthogonal. (i.e. the codes may be mathematically defined so that if two signals are received at the same time, with different codes, each signal may be reconstructed due to the encoding). Here, the code synthesis module 310 may create the BPSK modulation with a respective code having a rate specified by the chip rate selection module 312. In some further embodiments, other modulation schemes may be used as well. For example, quadrature phase-shift keying (QPSK), higher bit-order phase-shift keying (PSK), differential phase-shift keying (DPSK), or other modulation schemes may be used as well.

In some examples, the BPSK encoding may be chosen to create values of the phase modulation to place each channel in one of four orthogonal frequency quadrants formed by chopping the IF and Doppler bands in half. The BPSK encoding is discussed further with respect to block 502 of FIG. 5 below.

For transmission of a radar signal, the transmitter 302 may receive the signal output by the chirp synthesis module 308 after it has been mixed by mixer 306a along with the output of code synthesis module 310. When the mixer 306a mixes the chirp signal from the chirp synthesis module 308 with the output of code synthesis module 310, a modulated LFM radar signal is created. The transmitter 302 may transmit this modulated LFM radar signal.

When the receiver 304 receives reflected radio signals, the output of the receiver 304 may be coupled to the input of mixer 306b. The received reflected radio signals from the receiver 304 may be mixed with the output of the chirp synthesis module 308. By mixing radio signals from the receiver 304 with the output of the chirp synthesis module 308, the chirp is removed from the received signals. Removing the chirp signal may be known as "dechirping." After mixing, a signal is output that includes the superposition of phase-encoded reflections from many different ranges. The output of the mixer 306b may be supplied to receiver DSP 314. Receiver DSP 314 may be similar to DSP system 350 of FIG. 3B.

Figure 3B:
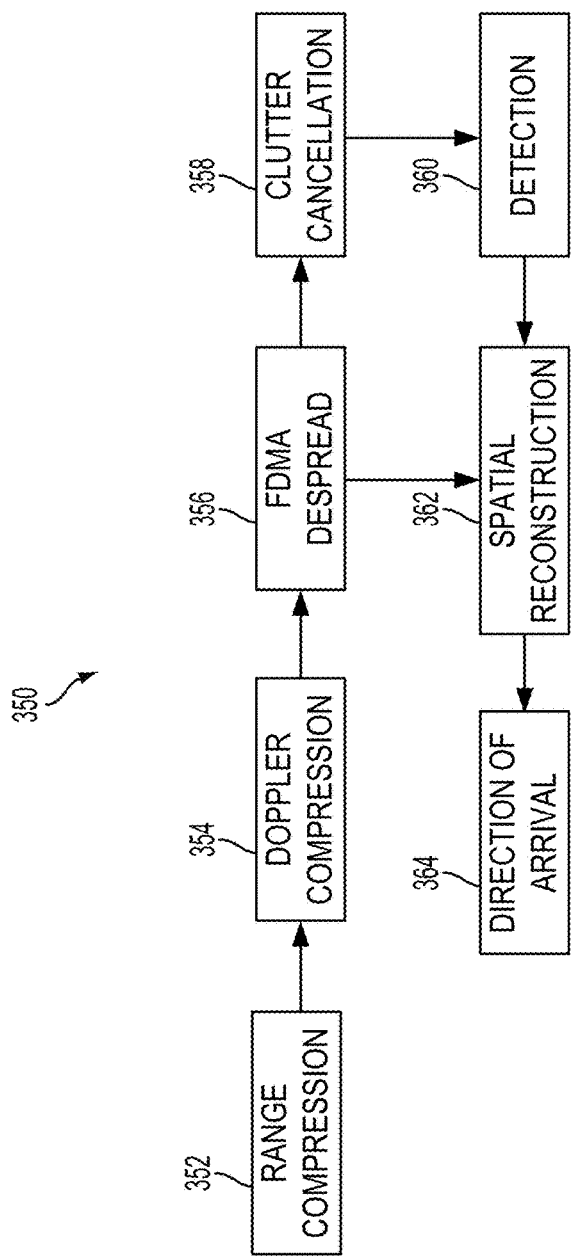
FIG. 3B illustrates an example radar DSP system with orthogonal linear frequency modulation for MIMO.

FIG. 3B illustrates an example radar DSP system 350 with orthogonal linear frequency modulation for MIMO. The example DSP system 350 includes blocks for range compression 352, Doppler compression 354, FDMA despread 356, clutter cancellation 358, detection 360, spatial reconstruction 362, and direction of arrival 364. Although the blocks are shown in a generally linear order, the order, alignment, and sequence of blocks may be different in various embodiments. In some further examples, blocks of both FIGS. 3A and 3B may be combined into fewer or divided into more blocks.

At the range compression 352 block and Doppler compression 354 blocks, the received signal is mixed with with a non-phase modulated chirp. The input to block 352 is the digitally sampled and demodulated signal. Signal demodulation is accomplished by mixing with a non-phase modulated reference chirp. At range compression 352, a Fast Fourier Transform (FFT) is applied to each pulse to transform to the range domain. At the Doppler compression 354 block, an FFT is applied across pulses to transform from slow time to the Doppler domain. These operations are performed on each receive channel.

At the FDMA despread 356 block, a despread operation is performed on the received signal. The despread operation introduces a phase correction to the received signal based on filtering range. The despread operation removes a distance-based phase offset from the various scatterer signals received by the radar unit. If not removed by the despread operation, the phase offset may create harmonics in a received signal. The time delay applied may be based on a range of interest over which the reflected signal will be analyzed. By applying the time delay, the signal output by the FDMA despread 356 may be adjusted in a way that the reflected signal may be decoded to supply information about the range of interest associated with the selected delay.

At the clutter cancellation 358 block, the signal from the FDMA despread 356 block is analyzed to determine clutter in the signal. Clutter is caused by undesirable echo signals in the received radar signal. Once clutter is identified, the undesirable reflection signals may be removed to result in a radar signal only having the desired reflections. At the clutter 358 block, an optional spatial filter is applied for each range-Doppler matched filter. This spatial filter is an Finite Impulse Response (FIR) notch filter designed at each Doppler filter designed to reject stationary clutter. Equivalent methods such as a Minimum Variance Distortionless Response (MVDR) beam former with a null constraint may be used. The filter uses the full MIMO virtual array, available after FDMA despread operation. The full MIMO virtual array is constructed at this stage, provided PRF is selected to be sufficiently high to prevent clutter aliasing within the spatial bandpass created by the radar's two-way antenna pattern.

At the detection 360 block, signal processing that may include a targeting algorithm, such as Constant false alarm rate (CFAR) or a similar target detection algorithm, that examines power at each range and Doppler matched filter and tests the target/no-target hypothesis. The output of detection is a list of candidate targets.

Additionally, at the spatial reconstruction 362 block, a reconstruction operation is performed on the received signal after the despread operation for each target detected. The reconstruction operation may be used to assemble the MIMO virtual array from the fast frequency and Doppler channels. Because a target may alias in Doppler, this block may perform additional signal processing to determine the correct ordering of spatial channels to form the virtual array. Two of the channels may be combined in the IF band to create a virtual channel that simulates a full MIMO array. After the reconstruction operation, a signal will be left that that results in tones corresponding to the region of interest. Additionally, after the reconstruction operation, the spatial spectrum may be formed using a traditional spatial steering matrix.

At the direction of arrival 364 block, the tones from the spatial reconstruction 362 block may be processed to determine the angle and the range at which reflections were received from various scatterers that reflected radar signals. The direction of arrival 364 block may be used to determine where scatterers are located. Further processing may determine what the objects are that caused the scattering. Therefore, the vehicle with the radar system may be controlled based on the objects that caused the scatterers.

In some embodiments, a computing device may implement the disclosed methods as computer program instructions encoded on a non-transitory computer-readable storage media in a machine-readable format, or on other non-transitory media or articles of manufacture.

Figure 4:
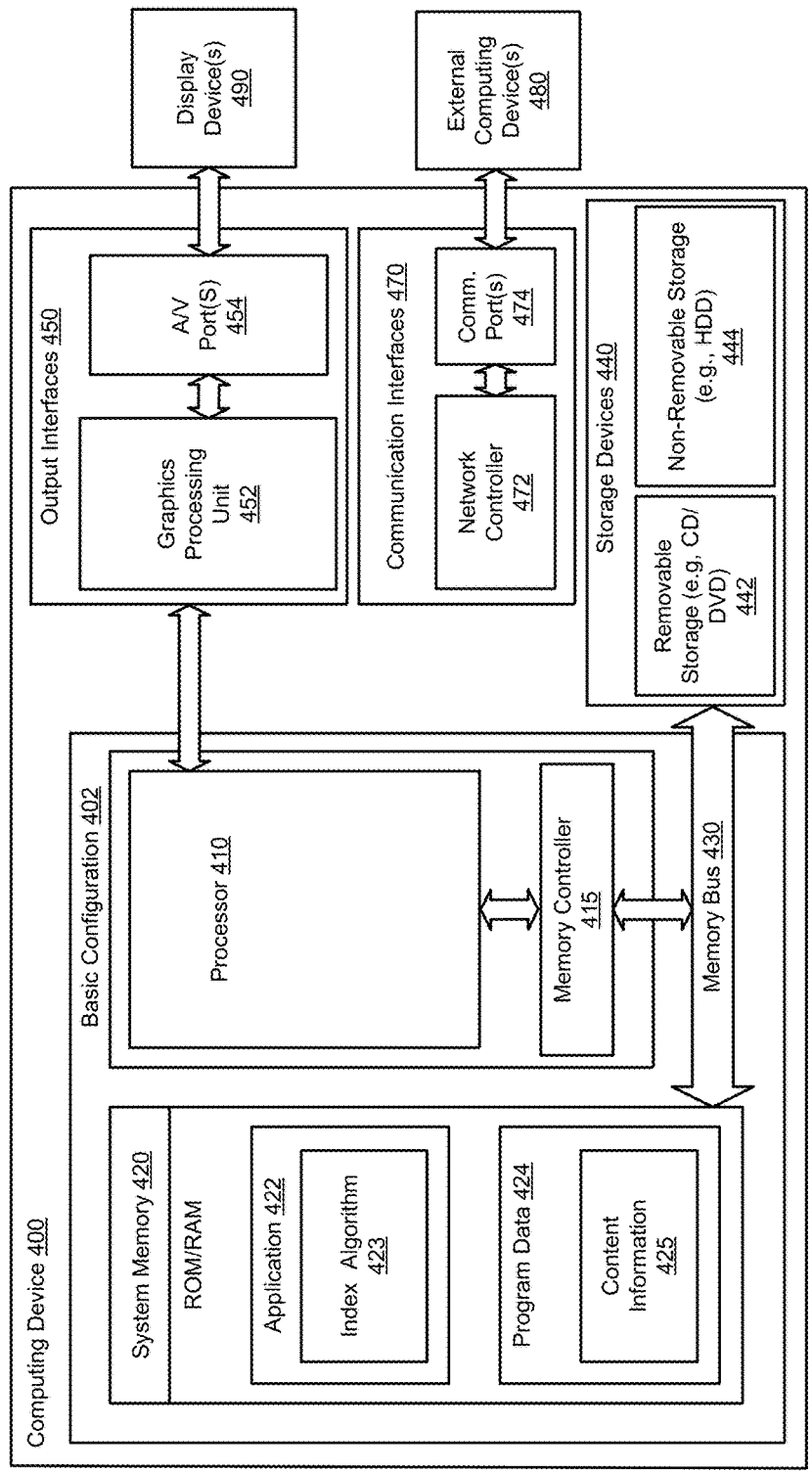
FIG. 4 illustrates an example computing device for performing some of the methods disclosed herein.

FIG. 4 illustrates a functional block diagram of a computing device 400, according to an embodiment. The computing device 400 can be used to perform functions in connection with radar units. In particular, the computing device can be used to perform some or all of the functions discussed above in connection with FIGS. 1-3 and FIG. 5 below. As shown in FIG. 4, the external computing device(s) 480 may be additional computing devices located external to the computing device 400.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (µP), a microcontroller (µC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, such as external computing device(s) 480, over a network communication by way of one or more communication ports 474. The communication connection is one example of communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium such as, but not limited to, a hard disk drive, a CD, a DVD, a digital tape, or memory. In some implementations, the signal bearing medium can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard or other transmission protocol).

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
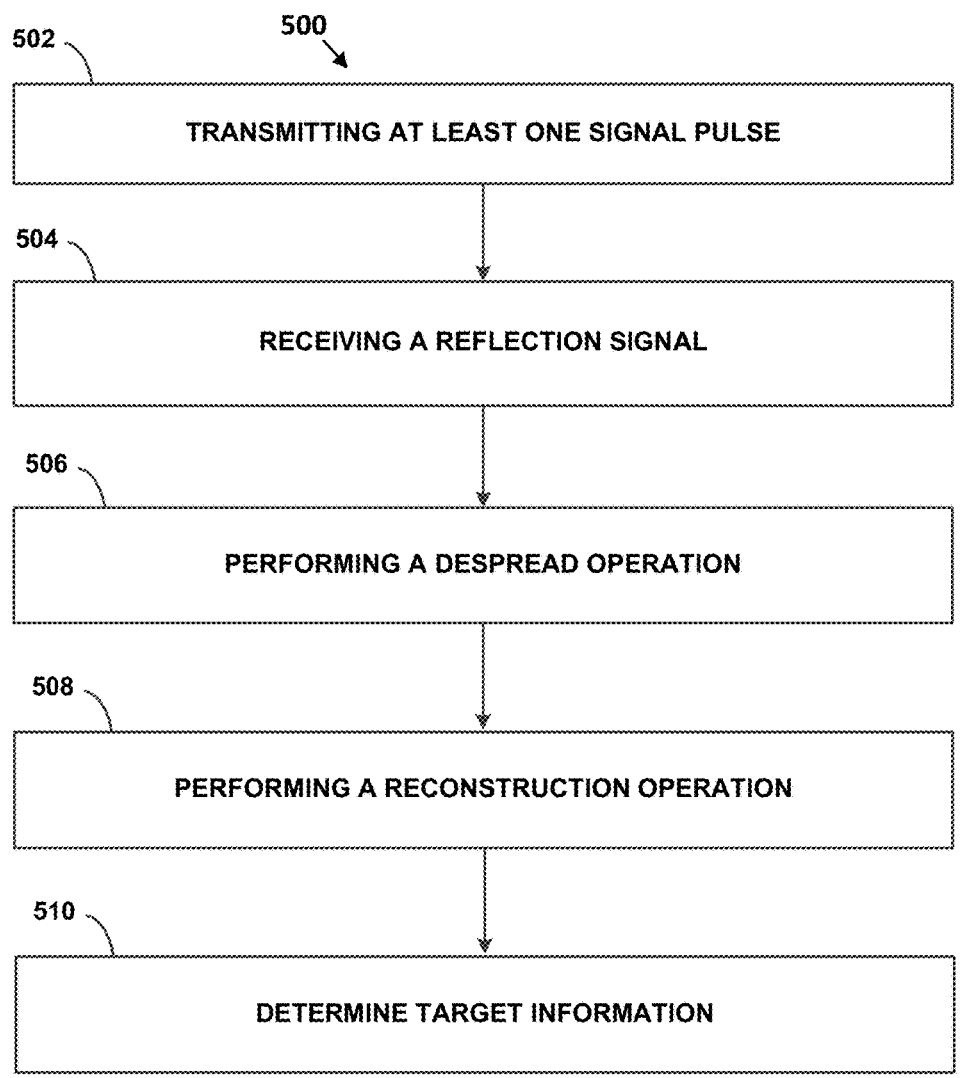
FIG. 5 is an example method for orthogonal linear frequency modulation for MIMO.

FIG. 5 is an example method 500 for orthogonal linear frequency modulation for MIMO Radar. At block 502, the method 500 includes transmitting at least one signal pulse with a radar system. The at least one signal pulse may be transmitted with a BPSK encoding.

As previously discussed, the transmitted pulse may be an LFM signal. Each transmitted pulse may be a chirp signal mixed with a BPSK encoding to form the modulated signal for transmission.

A general signal transmitted by the transmitter may have a phase history based on Equation 1. In Equation 1, $\Lambda_{ref}(t)$ is the phase history at a given time t, f is a carrier frequency, γ is the chirp rate, and $\hat{t}$ is the time relative to the start of a pulse.

$$\Lambda_{ref}(t)=2\pi f t+\pi\gamma\hat{t}^2 \quad \text{EQUATION 1}$$

The signal transmitted by the transmitter may have other properties designed to cause the MIMO characteristics described herein. For example, the waveform may be designed to precisely place BPSK switching boundaries between range filters. This places requirements on both the LFM and the BPSK portions of the modulation. Additionally, the waveform may be designed to contain clutter within half the pulse repetition frequency (PRF).

In one example, a waveform may be iteratively designed with the following algorithm. A minimum ramp bandwidth to support the desired range resolution and the maximum ramp rate may be defined based on the equations of Equation 2. The minimum range swath requirement and maximum IF bandwidth place a maximum bound on the LFM ramp rate.

Note that this equation is altered to scale the IF bandwidth by the number of IF channels. The value of B_if is the IF bandwidth, n_if_chan is the number of fast frequency channels, f_adc is the ADC sampling frequency, and range_swath is the amount of range the radar should process.

$$\min\_B\_ramp=c/(2*\text{range\_resolution})$$

$$\max\_ramp\_rate=(B\_if/n\_if\_chan)* c/(2*\text{range\_swath}) \quad \text{EQUATION 2}$$

The minimum ramp bandwidth and maximum ramp rate in turn create a minimum ramp duration, defined by t_ramp. Additionally, due to hardware and/or limitations, a limited number of ADC samples may be processed per ramp (max_n_adc), creating a maximum ramp duration, max_t_ramp. When a signal is received by a receiver, the receiver may use an ADC having a sample rate in order to digitize the received analog signal. Additionally, the waveform may be designed so that the number of ADC samples per pulse be a multiple of four (to allow cleanly dividing the IF). The number of ADC samples per pulse may be defined by n_adc_samp_per_pulse. Equation 3 provides definitions of t_ramp, max_t_ramp, and n_adc_samp_per_pulse.

$$t\_ramp=(\min\_B\_ramp/\max\_ramp\_rate)$$

$$\max\_t\_ramp=(\max\_n\_adc/f\_adc)$$

$$n\_adc\_samp\_per\_pulse=\text{ceil}(t\_ramp*f\_adc/4)*4 \quad \text{EQUATION 3}$$

Further, a range delay may be calculated for a single chip of the waveform. And, the range swath may be adjusted up to line this range with a whole number of range filters. These parameters may be specified by Equation 4.

$$r\_adc=(1/f\_adc)*c/2$$

$$tmp=\text{floor}(r\_adc/\text{range\_swath}*(n\_adc\_samp\_per\_pulse*0.25));$$

$$\text{range\_swath}=r\_adc/tmp*(n\_adc\_samp\_per\_pulse*0.25) \quad \text{EQUATION 4}$$

Creating the waveform may further include recalculating ramp rate and adjusting the RF bandwidth to keep the ramp duration and the number of ADC samples approximately constant. These adjustments may degrade range resolution a small amount. The ramp_rate, ramp_bandwidth, and the range_resolution are defined by Equation 5.

$$\text{ramp\_rate}=0.25*f\_adc*c/(2*\text{range\_swath})$$

$$\text{ramp\_bandwidth}=t\_ramp*\text{ramp\_rate}$$

$$\text{range\_resolution}=\text{range\_ipr\_broadening}* c/(2*\text{ramp\_bandwidth}) \quad \text{EQUATION 5}$$

Equation 6 may specify the modulation function that forms the phase modulation for a transmitted signal. In Equation 6, $\varphi_i$ is the phase modulation for the i-th channel of transmitted pulse p, Ci,p{k} indexes into k-th element the for the i-th channel of transmitted pulse p, mod(x,y) is the modulus operator, $f_{adc}$ is a sampling frequency of the Analog to Digital converter, and ceil(x) is the ceiling function. The value of the phase modulation is determined to place each channel in one of four orthogonal frequency quadrants formed by chopping the IF and Doppler bands in half. The four codes shown as $C_{x,p}$ cause four different orthogonal encoded signals that alternate a fast-time chirp with a slow-time chirp.

$$\varphi_i(\hat{t}) = \text{mod}(Ci, p\{\text{ceil}(f_{acd}\hat{t})\}, 1)$$

$$C_{1,p} = [p, p, p, \ldots]$$

$$C_{2,p} = [1, 0, 1, 0 \ldots] + p$$

$$C_{3,p} = [0, 0, 0 \ldots]$$

$$C_{4,p} = [1, 0, 1, 0, \ldots] \quad \text{EQUATION 6}$$

The chip pattern creates a square wave modulation in both fast time and slow time. This type of modulation would ordinarily undesirable problems with harmonics. To mitigate the creation of harmonics, during the waveform creation, BPSK modulation frequencies are selected to be half the IF and Doppler bandwidths. This frequency selection places square wave harmonics out of band and shifts channels away from one another in frequency by half the IF and Doppler bandwidths, reducing undesirable problems with harmonics. Additionally, in some examples, an analog filter may be inserted after modulation to reject modulation harmonics outside the operational RF band of the radar At block 504, the method 500 includes receiving a reflection signal. The reflection signal may be a single reflection or a signal including several reflected signals. Further, the reflection signal may include reflection signals from more than one transmitted pulse from more than one radar channel (e.g., another radar unit). The reflection signals may be reflected from objects within the field of view of the radar system. The reflection signals may be received by an antenna or antenna system of the radar system. The antenna may output signals based on the received reflections for further processing by the radar system.

An example equation representing received reflection signal has a phase history based on Equation 7. In Equation 7, Λ(t) is the phase history of the received signal at a given time t, r is a distance from an object that caused a reflection, and c is the speed of light. A received reflection signal having a phase modulation based on Equation 7 has a phase history based on Equation 8. In Equation 8, Λi(t) is the phase history of the received signal at a given time t.

$$\Lambda(t) = 2\pi f\left(t - \frac{2r}{c}\right) + \pi\gamma\left(\hat{t} - \frac{2r}{c}\right)^2 \quad \text{EQUATION 7}$$

$$\Lambda i(t) = 2\pi f\left(t - \frac{2r}{c}\right) + \pi\gamma\left(\hat{t} - \frac{2r}{c}\right)^2 + \phi_i\left(\hat{t} - \frac{2r}{c}, p\right) \quad \text{EQUATION 8}$$

At block 506, the method 500 includes performing a despread operation. As part of despread the received signal the radar system may use stretch processing. Stretch processing includes mixing the received signal with a similar signal to the transmission signal before digitization of the signal. For example, the received signal may be mixed with a chirp signal that is the conjugate of the chirp signal used to create the transmission signal. Stretch processing may reduce the digital bandwidth of the system by reducing the frequency of the various components of the received signals. For example, when a generic received reflection signal that has a phase history based on Equation 7 is mixed with a chirp, the result may be a signal defined similarly to Equation 9. In Equation 9, $\Lambda_{ref}^*(t)$ is the conjugate phase history of the chirp signal at a given time t. Further, when stretch processing is used with a received reflection signal having a phase modulation and phase history based on Equation 8, the result may be a signal defined similarly to Equation 10.

$$\Lambda(t)\Lambda ref^*(t) = \frac{4\pi fr}{c} + \frac{2\pi\gamma}{c}\hat{t}r + \frac{2\pi\gamma}{c}r^2 \quad \text{EQUATION 9}$$

$$\Lambda i(t)\Lambda ref^*(t) = \frac{4\pi fr}{c} + \frac{2\pi\gamma}{c}\hat{t}r + \frac{2\pi\gamma}{c}r^2 + \phi i\left(\hat{t} - \frac{2r}{c}, p\right) \quad \text{EQUATION 10}$$

A despread operation may introduce a phase correction to the received signal based on filtering range. The despread operation removes a distance-based phase offset from the various scatterer signals received by the radar unit. If not removed by the despread operation, the phase offset may create harmonics in a received signal. The received square wave has a frequency of $f_{if}/2$ and each chirp has duration $1/f_{if}$. With this modulation, the spacing of each matched filter in the fast frequency domain can be defined by Equation 11, where $B_{IF}$ is the IF bandwidth, γ is the ramp rate, and $n_s$ is the number of ADC samples per pulse. Further, Equation 12 defines the phase correction for a scatterer centered on the k-th range filter. The function sgn(x) of Equation 12 is the sign function. It returns 1 when x is positive, −1 when x is negative, and 0 when x is 0.

$$\Delta t_{rb} = \frac{2B_{IF}}{\gamma n_s} \quad \text{EQUATION 11}$$

$$-\pi\text{sgn}(-\sin(2\pi k \Delta t_{rb} f_{if}/2)) \quad \text{EQUATION 12}$$

In practice, each range matched filter has some bandwidth, so if a range filter straddles BPSK chip boundary, the correction introduced by Equation 12 will only partially correct for the ranges that excite that filter. This partial correction is not desirable and not easy to fix in signal processing. However, because constraints were placed on the transmitted waveform, all phase correction sign flips happen precisely between filters in the fast frequency domain. Thus, Equation 12 can correct based on the filtering range. Each range-Doppler filter is multiplied by a complex phasor with angle defined by equation 12.

The despread removes the large phase offset apparent in the received signal. After despread the phase history becomes that shown as Equation 13.

$$\Lambda i(t)\Lambda ref^*(t) = \frac{4\pi fr}{c} + \frac{2\pi\gamma}{c}\hat{t}r + \frac{2\pi\gamma}{c}r^2 + \phi i(\hat{t}, p) \quad \text{EQUATION 13}$$

At block 508, the method 500 includes performing a reconstruction operation. The reconstruction operation may be used to assemble a MIMO virtual aperture of a radar array. The orthogonal fast frequency and Doppler transmit channels separately encode spatial data from each transmit antenna to the radar receive channels. The reconstruction operation assembles the receive channel data from each orthogonal transmit channel into a single virtual spatial array. After the reconstruction operation, spectral analysis may be employed to estimate the bearing to one or more targets.

Because it is theoretically possible to process two targets (or one target and clutter) with different ambiguities in the same spatial spectrum it may be unnecessary to try to assemble the full virtual array's spectrum. Rather, as part of the reconstruction operation, two half arrays may be created. The phase difference between the two half arrays may be used to determine additional information. Although processing two half arrays may sacrifice resolution, resolution may be less critical at this stage than during clutter cancellation (where array ambiguity is not an issue and the full array is processed).

The additional information from the two half arrays relates to Doppler ambiguity. For a given peak in the spectrum, Doppler can be unambiguously determined at frequencies up to the PRF (instead of half the PRF) with the proper array reconstruction. The spatial signal history of a target may be given by Equation 14, where $d_r$ and $d_t$ are the receive and transmit element spacings, n and m are the receive and transmit element indices, and θ is the target angle of bearing.

$$s(n,m) = \exp(j2\pi d_r \sin(\theta)n/\lambda + j2\pi d_t \sin(\theta)m/\lambda)$$

$$s(n,m) = \exp(j2\pi f_r(n+\gamma m))$$

$$f_r = d_r \sin(\theta)/\lambda$$

$$\gamma = d_t/d_r \quad \text{EQUATION 14}$$

The reconstruction operation may also include multiplying the first half of the array with the conjugate of the second, as shown in Equation 15.

$$s(n,m)s(n,m+2)^* = \exp(j2\pi f_r(n+\gamma m))\exp(-j2\pi f_r(n+\gamma(m+2)))$$

$$s(n,m)s(n,m+2)^* = \exp(-j4\pi f_r\gamma) \quad \text{EQUATION 15}$$

The reconstruction operation may include an algorithm for disambiguation of Doppler up to the PRF. For each peak in the half array spatial spectrum, the algorithm may (i) extract the complex values of the peak from each half spectrum: $v_1$ and $v_2$ and (ii) calculate the array offset $v_1 v_2^*$. Additionally, for each peak, the proximity in angle to $\exp(-j4\pi f_r\gamma)$ determines array order. For angle $(v_1 v_2^* \exp(j4\pi f_r\gamma)) < \pi$ implies 'normal' ordering and a 'true' Doppler less than half the PRF. Alternatively, angle $(v_1 v_2^* \exp(-j4\pi f_r\gamma)) > \pi$ implies 'flipped' ordering and a 'true' Doppler more than half the PRF. Thus, the disambiguation may be corrected.

At block 510, the output of the reconstruction may be used to determine target information. As previously discussed, in one example, the tones output from the reconstruction block may be processed to determine the angle and the range at which reflections were received from various scatterers that reflected radar signals. The direction of arrival may be used to determine where scatterers are located and thus further processing may determine what the objects are that caused the scattering. Therefore, the vehicle with the radar system may be controlled based on the objects that caused the reflections.

It should be understood that various processes, including but not limited to those described above, may be involved with the radiating, reception, and/or modulation. It should also be understood that arrangements described herein are for purposes of example only. As such, those skilled in the art will appreciate that other arrangements and other elements (e.g., machines, apparatuses, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method of signaling with a radar system comprising:
    transmitting, by a radar unit, at least one signal pulse, wherein the transmitting comprises transmitting the at least one signal pulse with a binary phase shift keying (BPSK) encoding;
    receiving, by the radar unit, a signal associated with reflection of the at least one transmitted signal pulse, wherein the received signal comprises at least two channels;
    processing the received signal to determine target information, wherein the processing comprises:
        performing a despread operation, wherein the despread operation provides a phase offset based on a filtering range;
        performing a reconstruction operation, wherein the reconstruction operation comprises creating a virtual spatial channel based on combining the at least two channels; and
        determining the target information based on the virtual spatial channel; and
    controlling an autonomous vehicle based on the determined target information.

2. The method according to claim 1, wherein the despread operation further comprises mixing each reflection signal with a respective conjugate signal.

3. The method according to claim 1, wherein the processing further comprises, mixing, using a stretch processor, the received reflection signal with reference signals corresponding to the transmitted pulse.

4. The method according to claim 1, wherein the BPSK encoding creates a square wave having a frequency, wherein the square wave frequency is half of a frequency of an analog-to-digital converter frequency.

5. The method according to claim 1, wherein transmitting the at least one signal pulse comprises transmitting a waveform configured to contain clutter within half a pulse repetition frequency when processed by a receiving system.

6. The method according to claim 1, wherein transmitting the at least one signal pulse comprises transmitting a waveform configured to place BPSK switching boundaries between range filters.

7. The method according to claim 1, further comprising wherein transmitting the at least one signal pulse comprises transmitting a waveform having a linear frequency modulation.

8. A radar system comprising:
    a radar unit comprising:
        a transmitter configured to transmit at least one signal pulse with a binary phase shift keying (BPSK) encoding;
        a receiver configured to receive a signal associated with reflection of the at least one transmitted signal pulse, wherein the received signal comprises at least two channels;
    a processing unit being configured to:
        perform a despread operation on the received signal, wherein the despread operation provides a phase offset based on a filtering range;
        perform a reconstruction operation, wherein the reconstruction operation comprises creating a virtual spatial channel based on combining the at least two channels;

determine target information based on the virtual spatial channel; and control an autonomous vehicle based on the determined target information.

9. The system according to claim 8, wherein the despread operation further comprises mixing each reflection signal with a respective conjugate signal.

10. The system according to claim 8, wherein the processing further comprises, mixing, using a stretch processor, the received reflection signal with reference signals corresponding to the transmitted pulse.

11. The system according to claim 8, wherein the BPSK encoding creates a square wave having a frequency, wherein the square wave frequency is half of a frequency of an analog-to-digital converter frequency.

12. The system according to claim 8, wherein the at least one signal pulse is configured to contain clutter within half the pulse repetition frequency when processed by a receiving system.

13. The system according to claim 8, wherein the at least one signal pulse is configured to place BPSK switching boundaries between range filters.

14. The system according to claim 8, further comprising wherein the at least one signal pulse has a linear frequency modulation.

15. An article of manufacture including a non-transitory computer-readable medium, having stored thereon program instructions that, if executed by a computing device, cause the computing device to perform operations comprising:

transmitting, by a radar unit, at least one signal pulse, wherein the transmitting comprises transmitting the at least one signal pulse with a binary phase shift keying (BPSK) encoding;

receiving, by the radar unit, a signal associated with reflection of the at least one transmitted signal pulse, wherein the received signal comprises at least two channels;

processing the received signal to determine target information, wherein the processing comprises:

performing a despread operation, wherein the despread operation provides a phase offset based on a filtering range;

performing a reconstruction operation, wherein the reconstruction operation comprises creating a virtual spatial channel based on combining the at least two channels; and determining the target information based on the virtual spatial channel; and controlling an autonomous vehicle based on the determined target information.

16. The article of manufacture according to claim 15, wherein the despread operation further comprises mixing each reflection signal with a respective conjugate signal.

17. The article of manufacture according to claim 15, wherein the processing further comprises mixing, using a stretch processor, the received reflection signal with reference signals corresponding to the transmitted pulse.

18. The article of manufacture according to claim 15, wherein the BPSK encoding creates a square wave having a frequency, wherein the square wave frequency is half of a frequency of an analog-to-digital converter frequency.

19. The article of manufacture according to claim 15, wherein transmitting the at least one signal pulse comprises transmitting a waveform configured to contain clutter within half the pulse repetition frequency when processed by a receiving system.

20. The article of manufacture according to claim 15, wherein transmitting the at least one signal pulse comprises transmitting a waveform configured to place BPSK switching boundaries between range filters.

21. The article of manufacture according to claim 15, further comprising wherein transmitting the at least one signal pulse comprises transmitting a waveform having a linear frequency modulation.

* * * * *